(12) United States Patent
Wuest

(10) Patent No.: US 9,704,164 B2
(45) Date of Patent: Jul. 11, 2017

(54) VALIDATING HOURS OF OPERATION

(71) Applicant: Google Inc., Mountain View, CA (US)

(72) Inventor: Brandon Stephen Wuest, Redwood City, CA (US)

(73) Assignee: Google Inc., Mountain View, CA (US)

( * ) Notice: Subject to any disclaimer, the term of this patent is extended or adjusted under 35 U.S.C. 154(b) by 9 days.

(21) Appl. No.: 13/917,576

(22) Filed: Jun. 13, 2013

(65) Prior Publication Data

US 2015/0170156 A1 Jun. 18, 2015

(51) Int. Cl.
*G06Q 30/00* (2012.01)

(52) U.S. Cl.
CPC .................................. *G06Q 30/018* (2013.01)

(58) Field of Classification Search
USPC .......................................... 726/25, 17, 19, 5
See application file for complete search history.

(56) References Cited

U.S. PATENT DOCUMENTS

| | | | | |
|---|---|---|---|---|
| 7,373,244 | B2 * | 5/2008 | Kreft | 701/532 |
| 8,467,991 | B2 * | 6/2013 | Khosravy et al. | 702/153 |
| 2006/0101005 | A1 * | 5/2006 | Yang et al. | 707/3 |
| 2008/0168175 | A1 * | 7/2008 | Tran | 709/229 |
| 2013/0198196 | A1 * | 8/2013 | Myslinski | 707/740 |

* cited by examiner

*Primary Examiner* — Mark A Fleischer
(74) *Attorney, Agent, or Firm* — Dority & Manning, P.A.

(57) ABSTRACT

A system for validating hours of operation may include one or more computing devices and a memory. The one or more computing devices may receive hours of operation of a business for a day of a week and receive data items that are associated with a time of the day of the week, wherein the data items are also associated with the business being open or closed at the associated time of the day of the week. The one or more computing devices may determine, based at least in part on the data items, a likelihood that the hours of operation of the business for the day of the week are inaccurate. The one or more computing devices may provide to an electronic device associated with the business an indication that the hours of operation for the day of the week are likely inaccurate when the likelihood satisfies a threshold.

16 Claims, 8 Drawing Sheets

FIG. 7

VALIDATING HOURS OF OPERATION

TECHNICAL FIELD

The present description relates generally to hours of operation, and more particularly, but not exclusively, to validating hours of operation.

BACKGROUND

Online services, such an online business listing service or an online geographical map service, may provide a user with hours of operation of businesses that have physical locations, e.g. brick and mortar businesses. For example, an online service may allow businesses to input their hours of operation and the online service may then provide the hours of operation to users, such as in response to user searches. A user may rely on the hours of operation provided by the online service, e.g. to plan a trip to the physical location of a business. Accordingly, a user may be frustrated if they arrive to the physical location of the business at a time when the hours of operation provided by the online service indicate that the business should be open, but the business is in fact closed. The user may be disinclined from returning to the physical location of the business and the user may no longer utilize the online service to search for businesses. Thus, it may be beneficial for the user, the business, and the online service, if the hours of operation for businesses that are provided by the online service are accurate.

SUMMARY

The disclosed subject matter relates to a computer implemented method for validating hours of operation. The method may include receiving, by one or more computing devices, hours of operation of a business for a day of a week. The method may further include receiving, by the one or more computing devices, a plurality of data items that are each associated with a time of the day of the week, wherein each of the plurality of data items is associated with the business being open or closed at the associated time of the day of the week. The method may further include determining, by the one or more computing devices, based at least in part on the plurality of data items, a likelihood that the hours of operation of the business for the day of the week are inaccurate. The method may further include providing, by the one or more computing devices, to a first electronic device associated with the business, a first indication that the hours of operation for the day of the week are likely inaccurate when the likelihood satisfies a threshold.

The disclosed subject matter also relates to a non-transitory machine-readable medium embodying instructions that, when executed by a machine, cause the machine to perform a method for providing suggested hours of operation for a business. The method may include receiving hours of operation of a business for a day of a week. The method may further include receiving a plurality of data items that are each associated with a time of the day of the week, wherein each of the plurality of data items is indicative of a user request for interaction with the business or a user interaction with the business. The method may further include determining, based at least in part on the plurality of data items, a modified hours of operation of the business for the day of the week. The method may further include providing an indication of the modified hours of operation of the business for the day of the week.

The disclosed subject matter also relates to a system that includes one or more computing devices and a memory. The memory may include instructions that, when executed by the one or more computing devices, cause the one or more computing devices to: receive a plurality of hours of operation of a plurality of businesses, wherein each of the plurality of business is associated with a business category, determine, based at least in part on the plurality of hours of operation of the plurality of businesses, a profile hours of operation for the business category, receive hours of operation of another business, determine whether the hours of operation of the another business substantially coincide with the profile hours of operation, and provide a first suggestion to associate the another business with the business category when the received hours of operation substantially coincide with the profile hours of operation of the business category and the business is not associated with the business category.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

FIG. 7 illustrates an example user interface for a system for validating hours of operation in accordance with one or more implementations.

DETAILED DESCRIPTION

Figure 1:
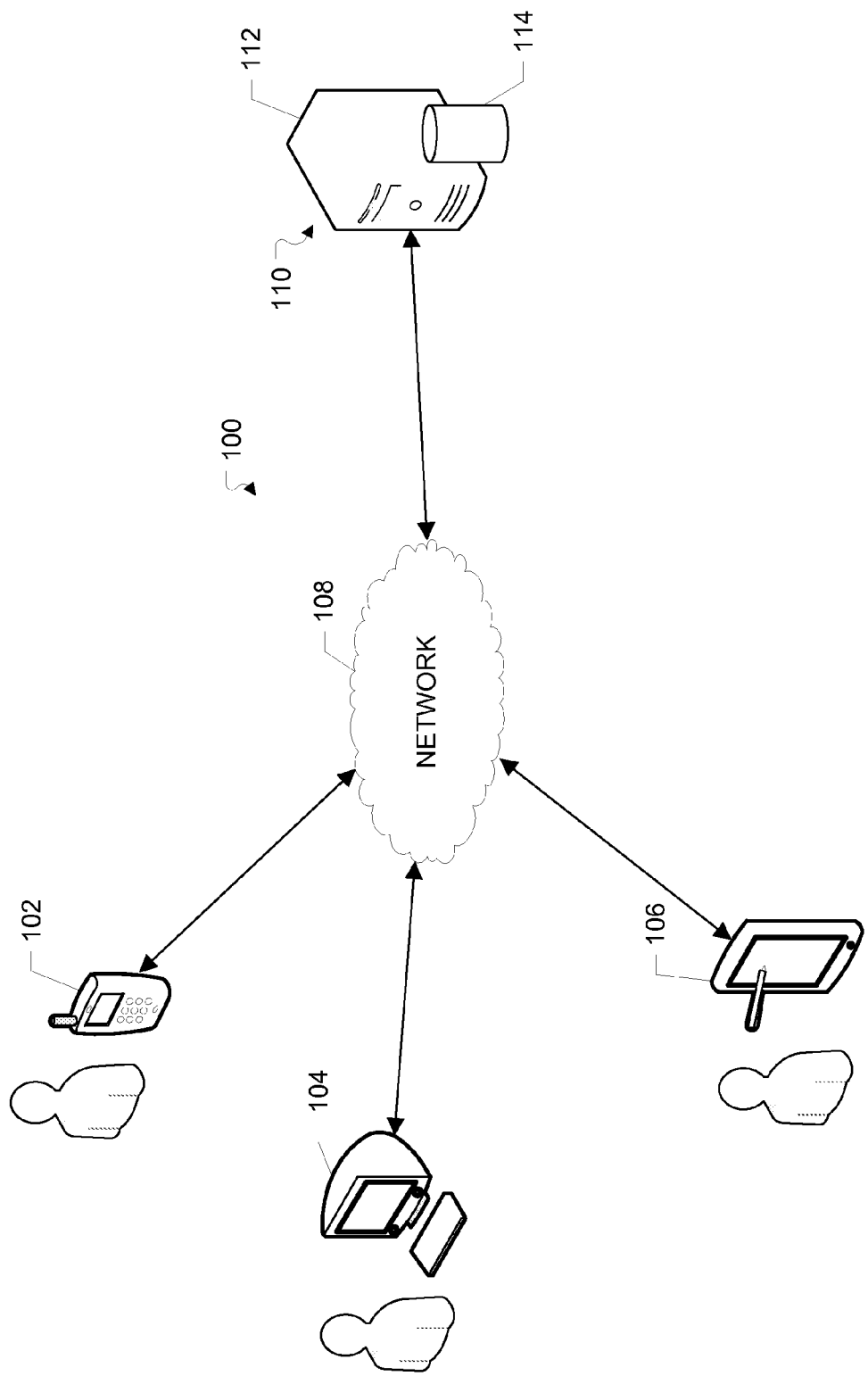
FIG. 1 illustrates an example network environment that may implement a system for validating hours of operation in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In some instances, structures and components are shown in block diagram form in order to avoid obscuring the concepts of the subject technology.

I. Overview

In the subject system for validating hours of operation, the hours of operation that are provided by a business are validated based on data items received from one or more disparate data sources. The data items may each be associated with a time of a day and the data items may each be associated with, and/or indicative of, the business being open or closed at the associated time of day. For example, the data items may include information indicating that a credit card transaction was conducted at the physical location of the business, that no employees are located at the physical location of the business, or generally any information that may be indicative of whether the business is open or closed at the associated time of day. In the case of the physical location of users, such as employees or customers of the business, the users may have to select an option with a service provider and/or install a particular application in order to obtain the benefits of, and/or participate in, the techniques discussed herein. The online service may aggregate the received data items to determine if there is a strong likelihood that the hours of operation provided by the business are inaccurate, e.g. if the data items indicate that the business is open later on a given day than the business provided hours of operation.

If the online service determines that there is a significant likelihood that the hours of operation provided by the business are inaccurate, e.g. for a day of the week, the online service generates estimated hours of operation for the business on the day of the week. The online service then provides the business with an indication that the business provided hours of operation are likely inaccurate for the day of the week, and the subject system provides the business with the hours of operation that were estimated by the online service for the day of the week. If the business confirms that the estimated hours of operation are correct, e.g. rather than the business provided hours of operation, the online service may update the business provided hours of operation based on the estimated hours of operation.

Upon determining that the hours of operation for a business may be inaccurate, the online service may provide users with the hours of operation for the business, and the estimated hours of operation for the business. In one or more implementations, the online service may only provide the estimated hours of operation for the business when the business provided hours of operation conflict with the estimated hours of operation. The online service may also provide a warning, or caveat, to a user if the time that the user searches for the hours of operation of the business coincides with a time that the business provided hours of operation may be inaccurate. For example, if there is a significant likelihood that the business is closed at the time that a user searches for the business, even though the business provided hours of operation indicate that the business is open, the online service may inform the user that the business may in fact be closed. The online service may also suggest that the user call the business before travelling to the physical location of the business.

In one or more implementations, the online service may also notify users when a business does not appear to be operating in accordance with the estimated hours of operation of the business and/or the business provided hours of operation. The online service may determine when data items received and/or not received for a business indicate that the business may be currently closed, even though the hours of operation indicate that the business should be open, and vice-versa. For example, if the hours of operation for a business indicate that the business opens at 6 AM on a given day, and if by 7 AM on the given day the online service has not received any data items that are indicative of the business being open, e.g. credit card transactions at the physical location of the business, an employee being located at the physical location of the business, customers being located at the physical location of the business for a threshold amount of time, etc., the online service may determine that there is a high likelihood that the business is closed, even though the hours of operation of the business indicate that the business should be open. The likelihood may be increased if the online service has not received any data items pertaining to the business by 7 AM on the given day and the online service normally receives certain data items by 7 AM on the given day, e.g. twenty credit card transactions. Accordingly, until the online service receives data items indicating that the business is open, the online service may provide a warning to users that the business may be closed even though the hours of operation indicate that the business is open. Conversely, if the hours of operation indicate that the business is not open for breakfast on a given day, but the received data items, e.g. credit card transactions, employee locations, etc., indicate that the business may be open for breakfast, the online service may provide a notification to users that the business may be open for breakfast even though the hours of operation indicate that the business is closed.

The subject system may also determine and suggest modified hours of operation to businesses. For example, if the data items received by the subject system indicate that most user interactions at the physical location of the business, such as credit card transactions, occur within a subset of the hours of operation, the subject system may suggest to the business that the hours of operation be reduced to the subset of the hours of operation. Alternatively, or in addition, if the data items received by the subject system indicate that a substantial number of user requests for interaction with the business, such as phone calls to the business, occur outside of the hours of operation of the business, the subject system may suggest that the business expand their hours of operation, e.g. such that the business is open during the time period when the substantial number of user requests for interaction are received.

The subject system may also develop profile hours of operation for different categories of businesses. For example, businesses that are listed by an online service may be categorized based on one or more business categories, such as restaurants, theaters, etc. The subject system may analyze the hours of operation of the businesses that are categorized under each business category to develop a profile hours of operation for each business category. The profile hours of operation for a business category may be the hours of operation that are the most common across all of the businesses that are categorized under the business category. After determining the profile hours of operation for the business categories, the subject system may receive hours of operation for another business. The subject system may determine whether the received hours of operation substantially coincide with the profile hours of operation of any of the business categories. If the received hours of operation substantially coincide with the profile hours of operation of a business category, the subject system may suggest that the business be associated with the business category.

Alternatively, or in addition, if the business is already associated with a business category when the hours of operation are received, the subject system may determine whether the received hours of operation substantially coincide with the profile hours of operation for the business category. If the received hours of operation for the business do not substantially coincide with the profile hours of operation for the business category, the subject system may suggest that the hours of operation of the business be conformed to the profile hours of operation for the business category, that the business be disassociated from the business category, and/or that the business be associated with another business category for which the profile hours of operation substantially coincide with the received hours of operation for the business.

In one or more implementations, if a business does not provide hours of operation to the online service, the online service may provide estimated hours of operation to the business. If the business confirms that the estimated hours of operation are correct, the online service may set the hours of operation of the business to the estimated hours of operation.

II. Example Network Environments for Systems for Validating Hours of Operation

FIG. 1 illustrates an example network environment 100 which may implement a system for validating hours of operation in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The example network environment 100 may include a number of electronic devices 102, 104, 106 communicably connected to a server 110, such as by the network 108. In another example, some or all of the electronic devices 102, 104, 106 may be communicably connected to one another, such as by the network 108, and some or all of the electronic devices 102, 104, 106 may not be communicably connected to the server 110. The network 108 may be a public communication network (such as the Internet, cellular data network, dialup modems over a telephone network) or a private communications network (such as private local area network ("LAN"), leased lines). The network 108 may also include, but is not limited to, any one or more of the following network topologies, including a bus network, a star network, a ring network, a mesh network, a star-bus network, a tree or hierarchical network, and the like.

In some example embodiments, the electronic devices 102, 104 and 106 can be computing devices such as laptop or desktop computers, smartphones, personal digital assistants ("PDAs"), portable media players, tablet computers, wearable devices, such as eyeglasses or watches that have one or more processors coupled thereto and/or embedded therein, televisions or other displays with one or more processors coupled thereto and/or embedded therein, or other appropriate computing devices that can be used to for displaying a web page, a web application, a mobile application, or another graphical user interface. In the example of FIG. 1, the electronic device 102 is depicted as a smartphone, the electronic device 104 is depicted as a desktop computer, and the electronic device 106 is depicted as a tablet device. In one or more implementations, the electronic devices 102, 104, 106 may be, or may include all or part of, the electronic system that is discussed further below with respect to FIG. 8.

In one example, server 110 may be a single computing device such as a computer server. In another example, server 110 may represent one or more computing devices (such as a cloud of computers and/or a distributed system) that are communicatively coupled, such as communicatively coupled over the network 108, that collectively, or individually, perform one or more functions that can be performed server-side, such as search result retrieval, advertising content retrieval, advertising content serving, validating hours of operation of a business, generating estimated hours of operation for a business, and/or generally any functions that can be performed server-side. The one or more computing devices of the server 110 may be geographically collocated and/or the one or more computing devices of the server 110 may be disparately located. The server 110 may be coupled with various databases, storage services, or other computing devices. The server 110, and the coupled databases, storage services, or other computing devices may be geographically collocated, or may be disparately located.

In one or more implementations, the server 110 includes a processing device 112 and a data store 114. The processing device 112 executes computer instructions stored in the data store 114, for example, to validate hours of operation of a business. In one or more implementations, the data store 114 may store the computer instructions on non-transitory computer-readable medium. In one or more implementations, the server 110 may be, or may include all or part of, the electronic system that is discussed further below with respect to FIG. 8.

The server 110 may host a web server that is communicatively coupled to client devices, such as web browsers and or web-based applications of client devices (e.g., electronic devices 102, 104 or 106) via network 108. In one example, the subject system may be integrated into one or more of a search engine, a business listing engine, a map engine, an advertising content retrieval system and/or an advertising content serving system hosted at server 110. In another example, the subject system may be hosted at server 110 and may be communicatively coupled to one or more remote servers hosting one or more other search engines, business listing engines, map engines, advertising content retrieval systems, advertising content serving systems, and/or third party systems (e.g., one or more remote servers) over one or more networks (e.g., network 108).

III. Example Processes for Systems for Validating Hours of Operation

Figure 2:
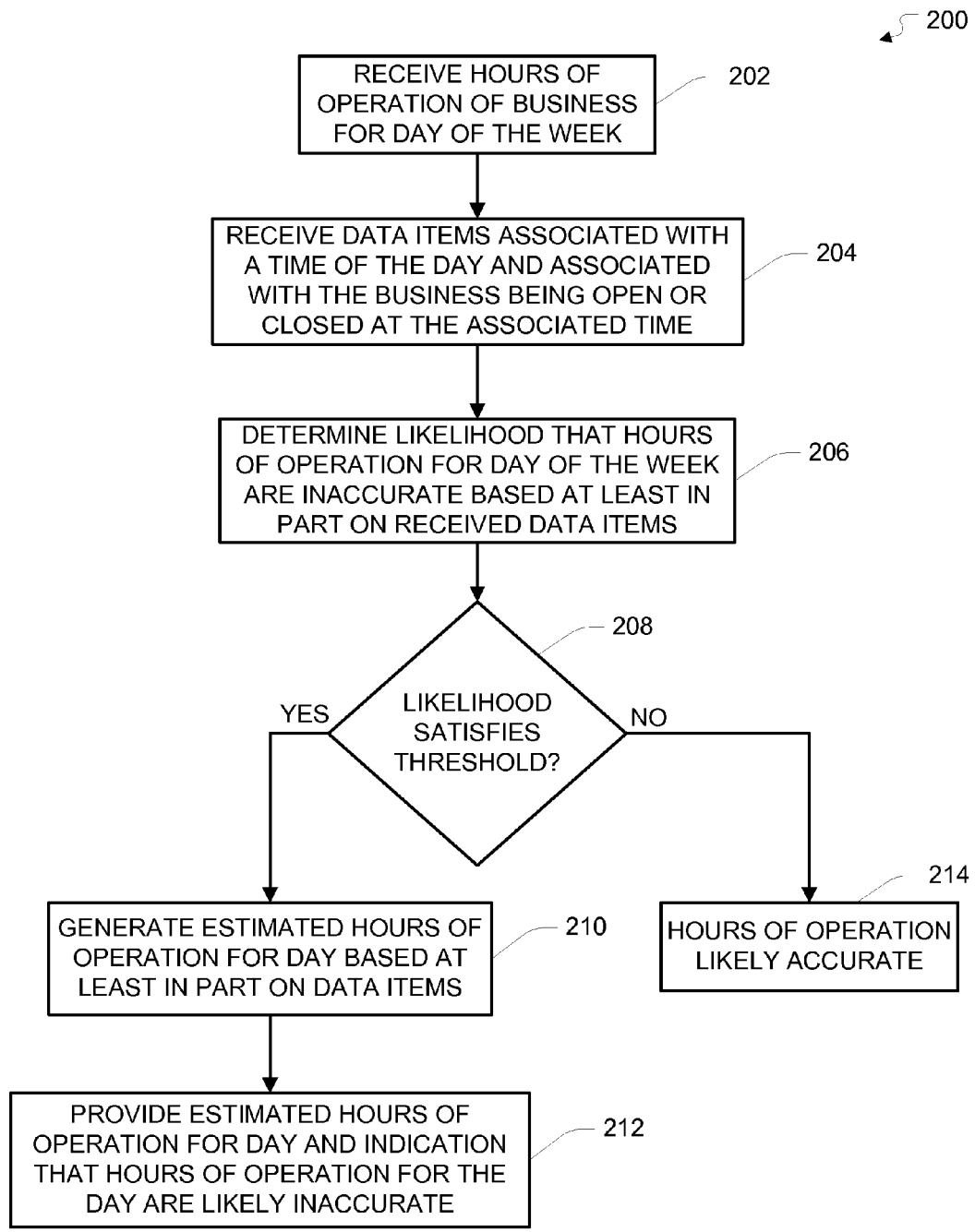
FIG. 2 illustrates a flow diagram of an example process for a system for validating hours of operation in accordance with one or more implementations.

FIG. 2 illustrates a flow diagram of example process 200 for a system for validating hours of operation in accordance with one or more implementations. For explanatory purposes, example process 200 is described herein with reference to example network environment 100 of FIG. 1; however, example process 200 is not limited to example network environment 100 of FIG. 1. Further for explanatory purposes, the blocks of example process 200 are described herein as occurring in serial, or linearly. However, multiple blocks of example process 200 may occur in parallel. In addition, the blocks of example process 200 need not be performed in the order shown and/or one or more of the blocks of example process 200 need not be performed.

In block 202, the server 110 receives the hours of operation of a business for at least one day of the week, e.g. from an electronic device 102 that is being interacted with by a user associated with the business, such as a manager or owner of the business. For example, the server 110 may provide a user interface to the electronic device 102 that allows the user associated with the business to provide the hours of operation of the business for at least one day of the week, e.g. such that the hours of operation can then be provided to requesting users. The hours of operation for a given day of the week may include an opening time and a closing time. In one or more implementations, the opening time may occur on a first day, e.g. at 5 P.M. on the first day, and the closing time may not occur until the following day, e.g. at 2 A.M. on the following day.

In block 204, the server 110 receives data items that are associated with a time of the day and with the business being open or closed at the associated time of the day. For example the server 110 may receive the data items over the network 108 from one or more of the electronic devices 102, 104, 106, and/or from a third party server. The data items may include, e.g., an indication that a credit card transaction is being conducted at the physical location of the business, an indication that an offer redemption is occurring at the physical location of the business, an indication that an employee is located at the physical location of the business, an indication that a customer is located at the physical location of the business, an indication that a door of the business has been opened or closed and/or that a security system of the business has been armed or disarmed, or generally any data items that may be associated with the business being opened or closed at the associated time of day. The time of the day associated with a data item may be the day/time that the data item was received and/or may be a day/time that an action associated with the data item occurred, such as a credit card transaction. In the case of the physical location of users, such as employees or customers of the business, the users may have to select an option with a service provider and/or install a particular application in order to obtain the benefits of, and/or participate in, the techniques discussed herein.

In one or more implementations, the server 110 may determine that an employee is located at the physical location of the business if the employee is located within a threshold distance of the physical location of the business. For example, a user associated with the business, such as the owner of the business, may identify a geographic region that encompasses the physical location of the business, e.g. a geofence around the business. If an employee of the business is located within the geographic region, e.g. as determined from receiving positioning information, such as global positioning system (GPS) information, the server 110 may determine that the employee is located at the physical location of the business. The server 110 may also determine that an employee is located at the physical location of the business when the server 110 receives a data item that indicates that a phone call was made from the physical location of the business, e.g. via a voice over internet protocol (VOIP) system.

In one or more implementations, the server 110 may also determine that an employee is located at the physical location of the business when the electronic device 102 of the employee is connected to a wireless access point that is located at the physical location of the business. For example, the server 110 may identify an electronic device 102 that is being accessed by an employee based on repeated access of the wireless access point by the electronic device 102, e.g. based on a Media Access Control (MAC) address of the electronic device 102. The server 110 may also determine that an employee is located at the physical location of the business based on the employee's interaction with other services that are provided by the server 110 and/or a third party server, such as a social network. For example, if the employee changes their status on a social network to "at work", or the employee provides some other indication on a social network, over a public messaging system, or through some other social media, that the indicates that the employee is at the physical location of the business, the server 110 may determine that the employee is at the physical location of the business.

In one or more implementations, the server 110 may employ similar mechanisms for determining when a customer is located at the physical location of the business. For example, if the server 110 receives a data item that indicates that an electronic device 102 is connected to a public wireless access point at the physical location of the business with a MAC address that has not previously accessed the wireless access point, the server 110 may determine that a customer is located at the physical location of the business. Similarly, if an electronic device 102 accesses a wireless access point at the physical location of the business using a password that is reserved for customers, the server 110 may determine that a customer is located at the physical location of the business. The server 110 may also determine that a customer is located at the physical location of the business when a user manually provides an indication that they are located at the physical location of the business, e.g. through a social network, through a system that allows users to review businesses, and/or generally through any system that allows users to manually indicate that they are at the physical location of a business.

In one or more implementations, the server 110 may receive data items from one or more third party servers that may indicate that an employee is, or is not, at a physical location of the business. For example, a user associated with the business may choose to have information pertaining to the security system of the business be transmitted from a security service provider to the server 110. Thus, the server 110 may receive real-time updates when one or more actions occur at the physical location of the business, such as arming/disarming the security system, the door of the business opening, motion detected at the business, etc. For example, disarming the system may be associated with the business being open, while arming the system may be associated with the business being closed. Similarly, the server 110 may receive data items from a credit card transaction service provider that is utilized by the business, a telephone service provider that is utilized by the business, an internet service provider that is utilized by the business, or generally any service provider that is capable of transmitting data items that may be associated with the business being opened or closed at an associated time of the day.

In one or more implementations, the server 110 may also receive data items from one or more third party servers that indicate that a customer is located at the physical location of the business. For example, the server 110 may receive data items from a social networking service, a user review service, or generally any service that is capable of providing data items that are indicative of a customer being at the physical location of the business.

In block 206, the server 110 determines a likelihood that the hours of operation indicated by the user associated with the business are inaccurate based at least in part on the received data items. In one or more implementations, the likelihood may be a decimal value, such as from 0 to 1, with 1 indicating the highest likelihood that the indicated hours of operation are inaccurate. Alternatively, or in addition, the likelihood may be a percentage from 0% to 100%, with 100% indicating the highest likelihood that the indicated hours of operation are inaccurate. For example, if the received data items indicate that customers are located at the physical location of the business before the indicated opening time for the business or after the indicated closing time for the business, the server 110 may determine that there is a high likelihood that the indicated hours of operation for the business are inaccurate, such as a likelihood value of 0.98 or 98%.

In one or more implementations, the server 110 may weight each received data item based on how strong of an indication is provided by each data item with respect to whether the business is open or closed at the associated time. For example, a customer or employee being located at the physical location of the business, as determined via a positioning system, such as GPS, may be associated with a high weight value, while a customer or employee being located at the physical location of the business, as determined from a manual indication received from the customer or employee, may be associated with a low weight value.

In one or more implementations, the server 110 may process the indicated opening and closing times and information relating to the physical location of the business to determine the likelihood that the received hours of operation are inaccurate. For example, since the opening and closing times of businesses generally occur on the hour, or on the half hour, if the opening time and/or the closing time of the business is indicated as a time that is not on the hour, or on the half hour, the server 110 may determine a high likelihood that the indicated hours of operation are inaccurate. Alternatively, or in addition, if information associated with the business indicates that the physical location of the business is in a first time zone, such as the central time zone, and the hours of operation for the business correspond to a second time zone, such as the pacific time zone, the server 110 may determine that there is a high likelihood that the indicated hours of operation of the business are inaccurate. In one or more implementations, if day of the week is a weekday and the hours of operation are different than those received for other weekdays, the server 110 may determine that there is a high likelihood that the indicated hours of operation are inaccurate.

In block 208, the server 110 determines whether the likelihood that the indicated hours of operation for the day are inaccurate satisfies a threshold. In one or more implementations, the threshold may be satisfied based on the likelihood value, such as when the likelihood value exceeds 0.5. Alternatively, or in addition, the threshold may be satisfied based at least in part on receiving or not receiving data items that are highly indicative of the business being opened or closed. For example, the threshold may be satisfied if the indicated hours of operation indicate that the business is open at a given time but the received data items indicate that there are never any employees at the physical location of the business at the given time.

If, in block 208, the server 110 determines that the likelihood that the indicated hours of operation are inaccurate does not satisfy the threshold, the server 110 moves to block 214. In block 214, the server 110 determines that the indicated hours of operation are likely accurate. The server 110 may store the indicated hours of operation, e.g. in the data store 114, along with an indication that the indicated hours of operation are likely accurate.

If, in block 208, the server 110 determines that the likelihood that the indicated hours of operation of the business are inaccurate satisfies the threshold, the server 110 moves to block 210. In block 210, the server 110 generates estimated hours of operation for the business for the day based at least in part on the received data items. For example, the server 110 may determine, based on the received data items that indicate employee and customer behavior with respect to the physical location of the business, an estimated opening time for the day and an estimated closing time for the day.

In one or more implementations, the server 110 may handle the received data items pertaining to employees differently than the received data items pertaining to customers, e.g. based at least in part on behaviors associated with employees and customers. For example, an employee may generally arrive to the physical location of the business before the business opens and may stay at the physical location of the business until after the business is closed, while a customer generally does not arrive to the physical location of the business until the business is open, and generally does not stay at the physical location of the business after the business has closed. Example time distributions of employee and customer presences at the physical location of a business are discussed further below with respect to the example user interface of FIG. 6.

In block 212, the server 110 provides the estimated hours of operation for the day, along with an indication that the indicated hours of operation for the day are likely inaccurate to the business, e.g. to an electronic device 102 that is being interacted with by a user associated with the business. The server 110 may also store, e.g. in the data store 114, the estimated hours of operation for the day, and the indication that the indicated hours of operation for the day are likely inaccurate.

For explanatory purposes, the example process 200 is discussed with reference to the hours of operation for a single day of the week. However, the example process 200 may be concurrently applied to multiple days of the week. In one or more implementations, the server 110 may repeat blocks 204-214, e.g. continually or on a periodic basis, in order to validate the indicated hours of operation on an on-going and/or real-time basis. For example, the server 110 may identify, on an ongoing basis, periods of time when the indicated hours of operation of the business are likely inaccurate based on received data items pertaining to transient events, e.g. unanticipated absences by employees, may provide an indication of the same to users.

Figure 3:
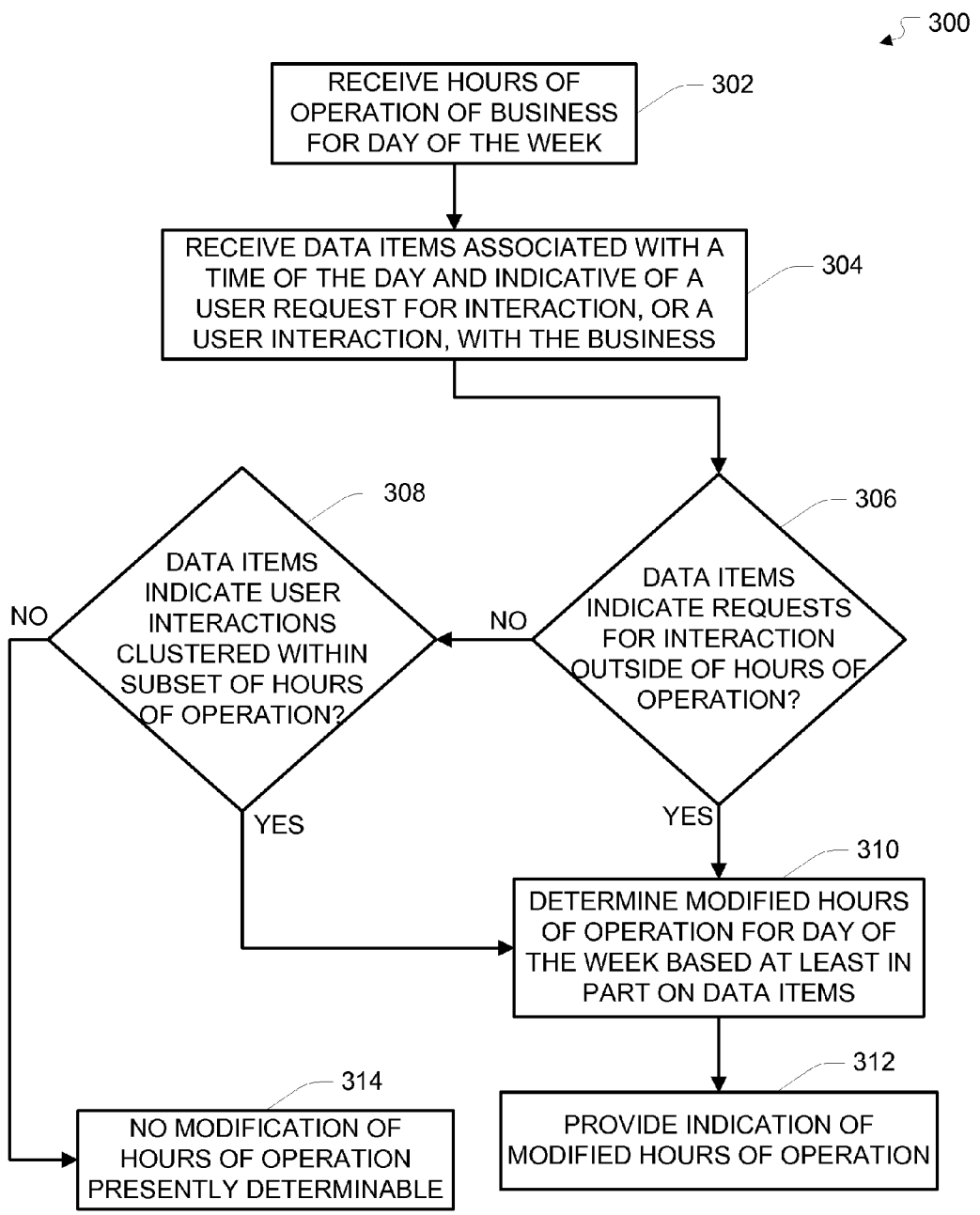
FIG. 3 illustrates a flow diagram of an example process for a system for validating hours of operation in accordance with one or more implementations.

FIG. 3 illustrates a flow diagram of example process 300 for a system for validating hours of operation in accordance with one or more implementations. For explanatory purposes, example process 300 is described herein with reference to example network environment 100 of FIG. 1; however, example process 300 is not limited to example network environment 100 of FIG. 1. Further for explanatory purposes, the blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed.

In block 302, the server 110 receives the hours of operation for a business for a day of the week, such as over the network 108 from an electronic device 102 that is being interacted with by a user associated with the business. In block 304, the server 110 receives data items that are associated with a time of day and indicative of a user request for interaction with the business, or a user interaction with the business. In one or more implementations, the received data items may be a subset of the received data items discussed above with respect to FIG. 2, the subset including data items that are indicative of a user request for interaction at the physical location of the business, such as a telephone call to the business, a request for directions to the business, etc., and/or data items that are indicative of a user interaction with the business, such as credit card transactions being conducted at the physical location of the business, offer redemptions occurring at the physical location of the business, etc.

In block 306, the server 110 determines whether the received data items indicate that requests for interaction with the business are being received outside of the hours of operation of the business, e.g. whether users are calling the business, requesting directions to the business, etc., outside of the indicated hours of operation for the business. In one or more implementations, the server 110 may determine whether the number of requests received outside of the hours of operation satisfies a threshold, such as a raw threshold, e.g. a raw number of requests, or a relative threshold, such as a number of requests received outside of the indicated hours of operation relative to the total number of requests received.

If, in block 306, the server 110 determines that no requests for interactions were received outside of the indicated hours of operation, or that the number of requests received outside of the indicated hours of operation does not satisfy a threshold, the server 110 moves to block 308. In block 308, the server 110 determines whether the received data items indicate that user interactions with the business are clustered around a subset of the indicated hours of operation for the business. For example, the server 110 may determine whether the majority of credit card transactions and/or offer redemptions are occurring within a subset of the indicated hours of operation.

If, in block 308, the server 110 determines that the data items do not indicate that user interactions are clustered within a subset of the indicated hours of operation of the business, e.g. the user interactions are spread throughout the indicated hours of operation, the server 110 moves to block 314. In block 314, the server 110 determines that there is presently no modification of the indicated hours of operation determinable for the day of the week.

If, in block 308, the server 110 determines that the data items indicate that user interactions are clustered within a subset of the indicated hours of operation, or if, in block 306, the server 110 determines that the data items indicate that requests for interaction are received outside of the hours of operation, the server 110 moves to block 310. In block 310, the server 110 determines modified hours of operation for the business based at least in part on the received data items. For example, if the received data items indicate that requests for interactions are being received outside of the indicated hours of operation, the server 110 may determine that the hours of operation should be expanded, e.g. to include the time periods when the requests for interaction are being received. Alternatively, or in addition, if the received data items indicate that user interactions are clustered within a subset of the indicated hours of operation, the server 110 may determine that the hours of operation should be modified to the subset of the hours of operation. In one or more implementations, the server 110 may determine that the closing time of the business should be extended, e.g. based on received requests for interaction, and that the opening time of the business should be delayed, e.g. based on a clustering of the user interactions. In block 312, the server 110 provides an indication of the modified hours of operation, e.g. to an electronic device 102 that is being interacted with by a user associated with the business.

For explanatory purposes, the example process 300 is discussed with reference to the hours of operation for a single day of the week. However, the example process 300 may be concurrently applied to multiple days of the week. In one or more implementations, the server 110 may repeat blocks 304-314, e.g. continually or on a periodic basis, in order to continually determine whether the hours of operation of the business should be modified.

Figure 4:
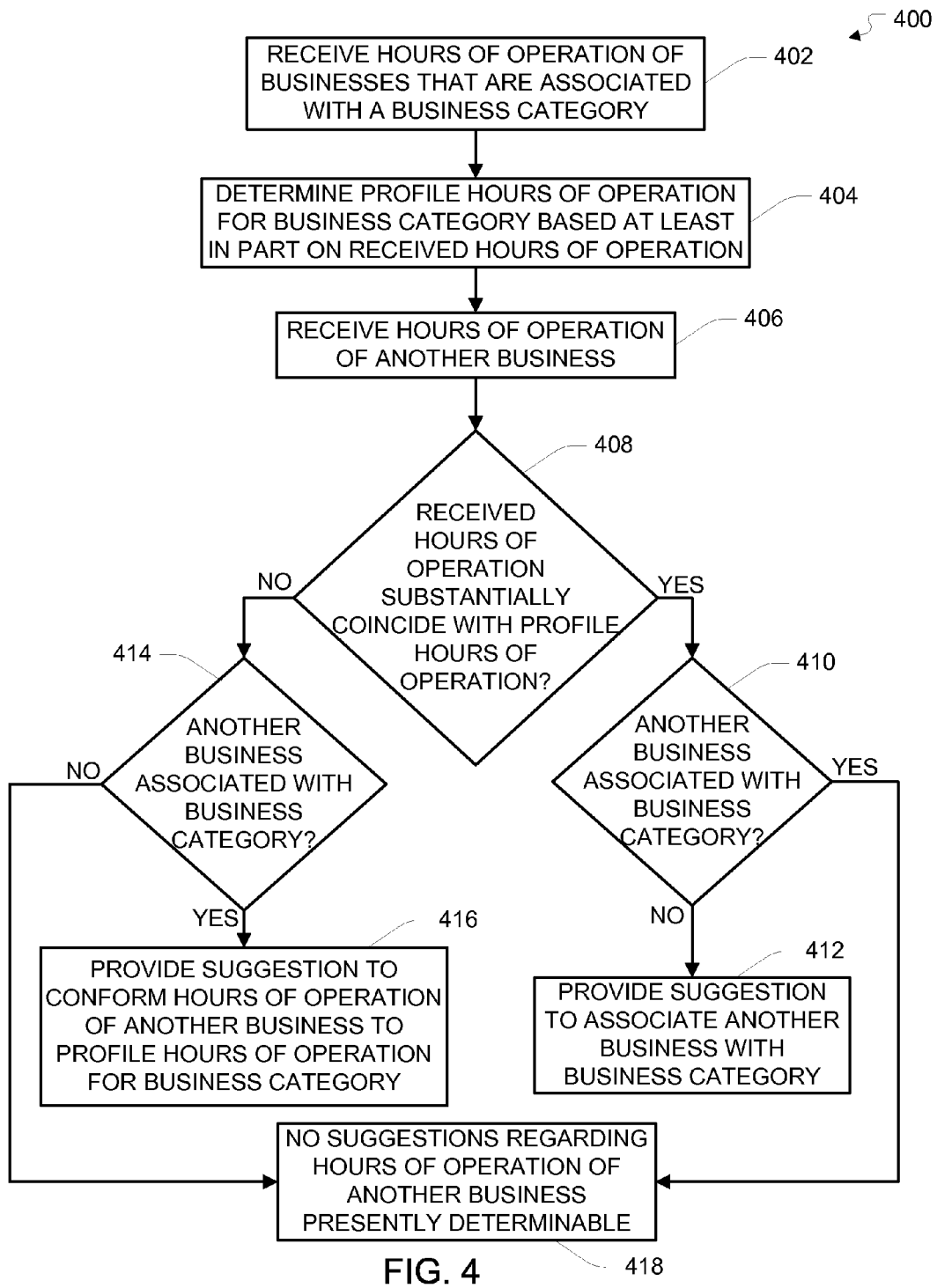
FIG. 4 illustrates a flow diagram of an example process for a system for validating hours of operation in accordance with one or more implementations.

FIG. 4 illustrates a flow diagram of example process 400 for a system for validating hours of operation in accordance with one or more implementations. For explanatory purposes, example process 400 is described herein with reference to example network environment 100 of FIG. 1; however, example process 400 is not limited to example network environment 100 of FIG. 1. Further for explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

In block 402, the server 110 receives the hours of operation of one or more businesses that are associated with a business category, e.g. from electronic devices 102, 104, 106 being interacted with by users associated with the businesses. For example, each business may be associated with one or more business categories that describe, or relate to, the business, e.g. a restaurant category, an automobile repair category, etc. In one or more implementations, the hours of operation may be received over a period of time, such as a day, a week, a month, etc. In one or more implementations, the received hours of operation for the businesses may be the estimated hours of operation for the businesses, e.g. as retrieved from the data store 114.

In block 404, the server 110 determines profile hours of operation for the business category based at least in part on the received hours of operation of the businesses. For example, the server 110 may determine an average opening and/or closing time of the businesses, a median opening and/or closing time, or a mean opening and/or closing time. In one or more implementations, the server 110 may round the determined profile hours of operation to the nearest half hour and/or to the nearest hour.

In block 406, the server 110 receives the hours of operation of another business, e.g. a business for which the hours of operation were not included in the profile hours of operation determination for the business category. In one or more implementations, the received hours of operation for the another business may be the estimated hours of operation for the another business, e.g. as retrieved from the data store 114. In block 408, the server 110 determines whether the received hours of operation substantially coincide with the profile hours of operation for the business category. In one or more implementations, the received hours of operation may substantially coincide with the profile hours of operation if the received opening time and/or closing time for each day are within a threshold amount of time of the opening time and/or closing time for each day of the profile hours of operation. The threshold may be configurable by the server 110 and, in one or more implementations, may be set to, e.g., two hours, or any amount of time.

If, in block 408, the server 110 determines that the received hours of operation substantially coincide with the profile hours of operation, the server 110 moves to block 410. In block 410, the server 110 determines whether the another business for which the hours of operation were received is associated with the business category. If, in block 410, the server 110 determines that the another business is not associated with the business category, the server 110 moves to block 412. In block 412, the server 110 provides a suggestion, e.g. to an electronic device 102 that is being interacted with by a user associated with the another business, to associate the another business with the business category, e.g. since the hours of operation of the another business substantially coincide with the profile hours of operation of the business category.

If, in block 408, the server 110 determines that the received hours of operation of the another business do not substantially coincide with the profile hours of operation, the server 110 moves to block 414. In block 414, the server 110 determines whether the another business for which the hours of operation were received is associated with the business category. If, in block 414, the server 110 determines that the another business is associated with the business category, the server 110 moves to block 416. In block 416, the server 110 provides a suggestion, e.g. to an electronic device 102 that is being interacted with by a user associated with the another business, to conform the hours of operation of the another business to the profile hours of operation for the business category, e.g. since the hours of operation of the another business do not substantially coincide with the profile hours of operation of the business category and the another business is associated with the business category. Alternatively, or in addition, the server 110 may suggest that the another business remove the association with the business category.

If, in block 410, the server 110 determines that the another business is associated with the business category, or if, in block 414, the server 110 determines that the another business is not associated with the business category, the server 110 moves to block 418. In block 418, the server 110 determines that there are no suggestions regarding the received hours of operation for the another business that are presently determinable.

Figure 5:
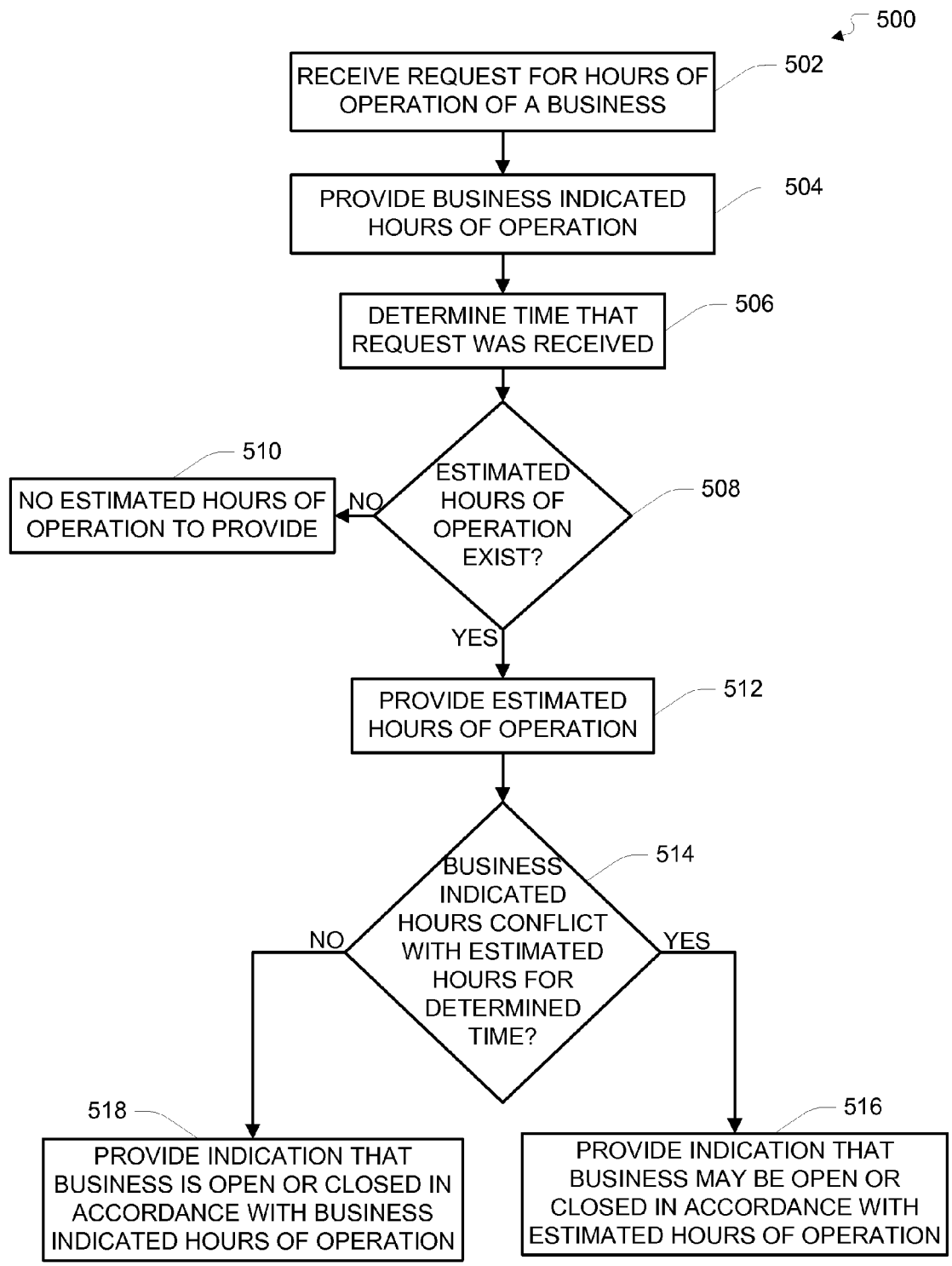
FIG. 5 illustrates a flow diagram of an example process for a system for validating hours of operation in accordance with one or more implementations.

FIG. 5 illustrates a flow diagram of example process 500 for a system for validating hours of operation in accordance with one or more implementations. For explanatory purposes, example process 500 is described herein with reference to example network environment 100 of FIG. 1; however, example process 500 is not limited to example network environment 100 of FIG. 1. Further for explanatory purposes, the blocks of example process 500 are described herein as occurring in serial, or linearly. However, multiple blocks of example process 500 may occur in parallel. In addition, the blocks of example process 500 need not be performed in the order shown and/or one or more of the blocks of example process 500 need not be performed.

In block 502, the server 110 receives a request for the hours of operation of a business, such as from an electronic device 102 that is being interacted with by a user. For example, a user may be interacting with the electronic device 102 to search for the hours of operation for the business, and the user may request the hours of operation for the business from the server 110. In block 504, the server 110 provides, for display, the business indicated hours of operation, such as to the electronic device 102 being interacted with by the user. An example user interface for displaying the business indicated hours of operation is discussed further below with respect to FIG. 7. In one or more implementations, the business indicated hours of operation may be the hours of operation that were received by the server 110 from an electronic device 104 that was being interacted with by a user associated with the business, such as an owner of the business.

In block 506, the server 110 determines the time that the request for the hours of operation for the business was received. In block 508, the server 110 determines whether estimated hours of operation exist for the business for the current week (or some other current time period), e.g. based on the time that the request was received, such as in the data store 114. As previously discussed, the estimated hours of operation may be determined over any period of time, such as an hour, a day, a week, a month, etc. For example, the server 110 may continually determine estimated hours of operation for the business, e.g. in real-time, in order to account for transient events, such as holidays, unanticipated employee absences from the physical location of the business, e.g. due to sickness, etc. Thus, the estimated hours of operation may continually fluctuate based on the day and/or time that the request for the hours of operation is received.

If, in block 508, the server 110 determines that no estimated hours of operation exist for the business, the server 110 moves to block 510. In block 510, the server 110 does not provide any estimated hours of operation and completes the example process 500. If, in block 508, the server 110 determines that estimated hours of operation exist for the business, the server 110 moves to block 512. In block 512, the server 110 provides, for display, the estimated hours of operation for the business, such as to the electronic device 102 being interacted with by the user. In one or more implementations, the server 110 may only provide the estimated hours of operation when the estimated hours of operation conflict with the business indicated hours of operation. An example user interface for displaying the estimated hours of operation for the business is discussed further below with respect to FIG. 7.

In block 514, the server 110 determines whether the business indicated hours of operation conflict with the estimated hours of operation for the determined time that the request was received. If, in block 514, the server 110 determines that the business indicated hours of operation conflict with the estimated hours of operation for the determined time that the request was received, the server 110 moves to block 516. In block 516, the server 110 provides, for display, an indication, e.g. to the electronic device 102 that is being accessed by the user, that the business may be open (or closed) in accordance with the estimated hours of operation and contrary to the business indicated hours of operation. For example, if the business indicated hours of operation indicate that the business is open, but the estimated hours of operation indicate that the business may be closed, the server 110 may provide an indication stating that the business may be closed, contrary to the business indicated hours of operation, and suggesting that the user call the physical location of the business before travelling there. An example user interface for displaying such an indication is discussed further below with respect to FIG. 7.

In one or more implementations, the server 110 may determine that the business indicated hours of operation may conflict with estimated hours of operation when data items are received that indicate the occurrence of temporary and/or transient events, e.g. the owner leaving the physical location of the business, unanticipated employee absences, e.g. due to sicknesses, federal holidays occurring on the day that the request is received, etc.

If, in block 514, the server 110 determines that the business indicated hours of operation do not conflict with the estimated hours of operation for the time when the request was received, the server 110 moves to block 518. In block 518, the server 110 provides, for display, an indication that the business is open or closed in accordance with the business indicated hours of operation. An example user interface for displaying such an indication is discussed further below with respect to FIG. 7.

IV. Example User Interfaces for Systems for Validating Hours of Operation

Figure 6:
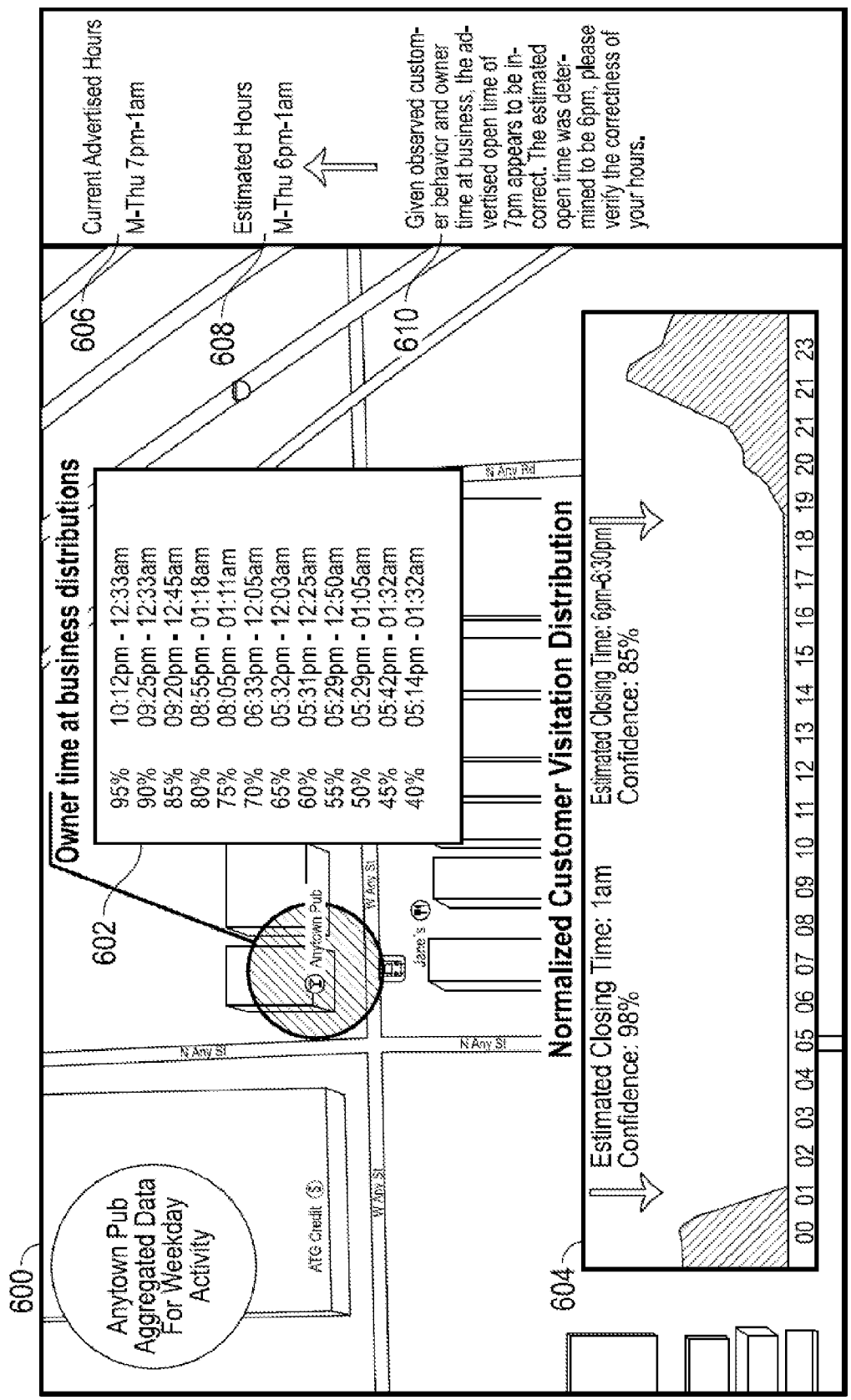
FIG. 6 illustrates an example user interface for a system for validating hours of operation in accordance with one or more implementations.

FIG. 6 illustrates an example user interface 600 for a system for validating hours of operation in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 600 includes an owner time distribution 602 for a business, a customer time distribution 604 for the business, business indicated weekday hours of operation 606, estimated weekday hours of operation 608, and reasons for estimated weekday hours of operation 610. In operation, the server 110 may provide the user interface 600 to an electronic device 102 that is being interacted with by a user that is associated with the business, such as the owner of the business.

The owner time distribution 602 may indicate the percentage of weekdays that the business is open that the owner is located at the physical location of the business for various entire time periods, e.g. as determined from received data items. For example, in the user interface 600, 95% of the weekdays that the business is open, the owner is at the physical location of the business from the entire time period of 10:12 P.M. until 12:33 A.M., and 40% of the weekdays that the business is open the owner is at the physical location of the business for the entire time period of 5:14 P.M. until 1:32 A.M.

The customer time distribution 604 may indicate the normalized customer visitations to the physical location of the business at various times on weekdays when the business is open, e.g. as determined from received data items. As shown in the customer time distribution 604, customers generally arrive at the physical location of the business between 6:00 P.M. and 6:30 P.M. and customers generally leave the physical location of the business at approximately 1:00 A.M. The server 110 may determine, based at least in part on data items that indicate when customers are located at the physical location of the business, that there is an 85% probability, or 0.85 likelihood value, that the business opens at 6 P.M., and that there is a 98% probability, or a 0.98 likelihood value, that the business closes at 1 A.M.

In one or more implementations, the server 110 may receive content items from the electronic devices 102, 104, 106 of multiple employees of the business, e.g. content items that indicate that the employees are at the physical location of the business. In order to account for the multiple employees, the server 110 may combine the time periods that the individual employees are determined to be at the physical location of the business in order to estimate the hours of operation for the business. For example, a first employee may arrive at the physical location of the business between 9:42 A.M. and 10:13 A.M. and may leave the physical location of the business between 4:36 P.M. and 6:02 P.M., and a second employee (e.g., the owner in the example discussed with respect to FIG. 6) may arrive at the physical location of the business around 5 P.M. and may leave the physical location of the business at around 1 A.M. Thus, in this example the server 110 may determine that the estimated hours of operation of the business are from 10 A.M. to 1 A.M.

The user interface 600 displays the business indicated weekday hours of operation 606, the estimated weekday hours of operation 608, and the reasons for the estimated weekday hours of operation 610. The reasons for the estimated weekday hours of operation 610 may provide the business with some insight into why the business indicated hours of operation are likely inaccurate. The user interface 600 may also request that the business verifies whether the business indicated hours of operation 606 are accurate, e.g. as requested in the reasons for the estimated weekday hours of operation 610 in the user interface 600.

Figure 7:
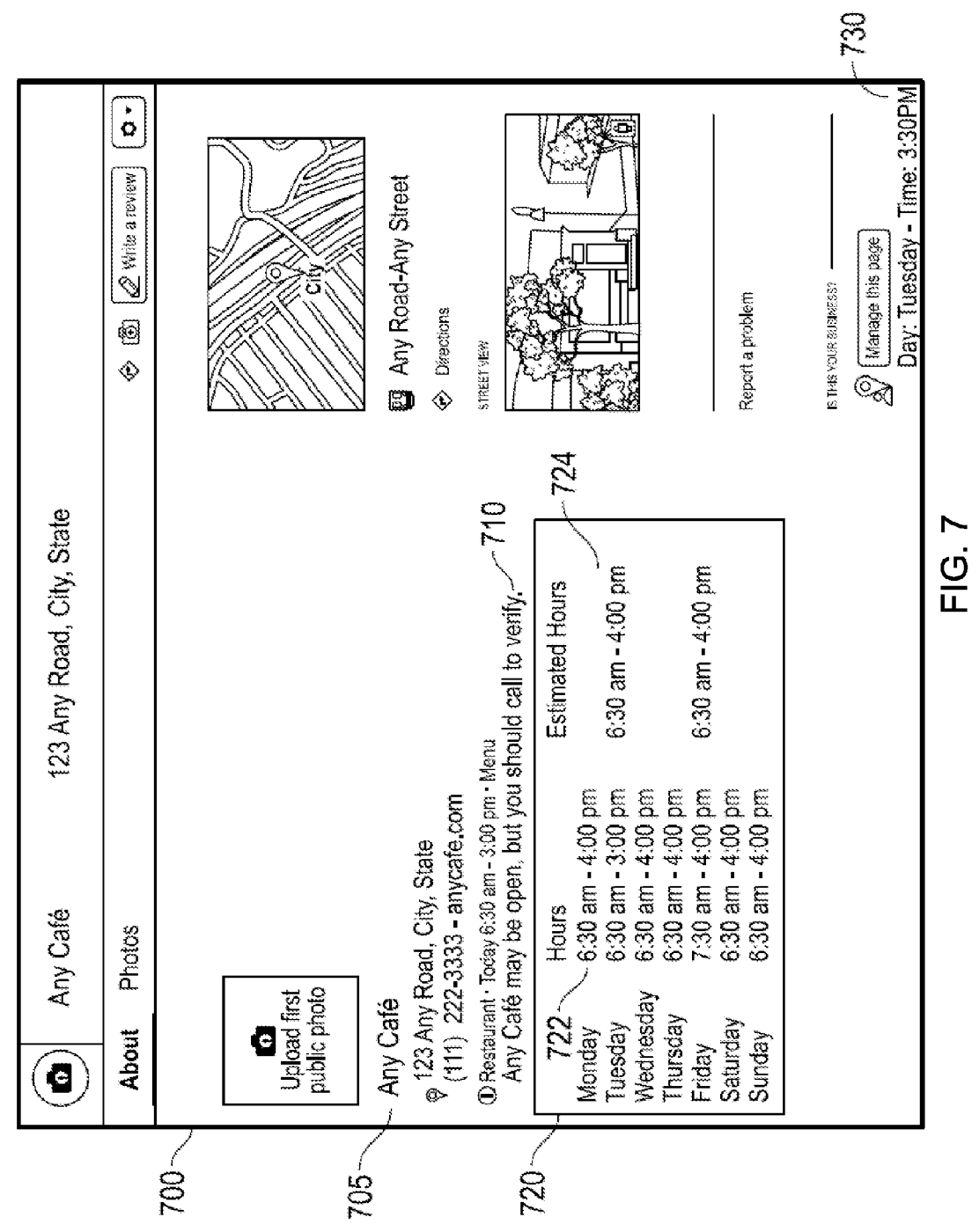

FIG. 7 illustrates an example user interface 700 for a system for validating hours of operation in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 700 may include business information 705, a current business status indication 710, an hours of operation section 720, and a current time 730. The hours of operation section 720 may include business indicated hours of operation 722 and estimated hours of operation 724. In one or more implementations, the current time 730 may not be displayed in the user interface 700. In operation, the server 110 may provide the user interface 700 to an electronic device 104 that is being interacted with by a user, e.g. in response to receiving a request from the electronic device 104 for information pertaining to the business and/or for the hours of operation of the business.

The server 110 may provide the current business status indication 710 based on the time when the request was received, e.g. as indicated by the current time 730. If, at the time that the request was received, the business indicated hours of operation 722 conflict with the estimated hours of operation 724, the server 110 may provide an indication that the business may or may not be open, e.g. based on the estimated hours of operation 724, along with a caveat, such as that the user should call the physical location of the business to verify. In the user interface 700, the current time 730 is 3:30 P.M. on Tuesday, and the business indicated hours of operation 722 indicate that the business is closed, while the estimated hours of operation 724 indicate that the business is open. Thus, the current business status indicator 710 states that the business may be open, e.g. in accordance with the estimated hours of operation 724, but that the user should call the business to verify.

In one or more implementations, the estimated hours of operation 724 may change on a continual basis, e.g. to account for transient events that may occur, such as unanticipated openings or closings of the business. Thus, the estimated hours of operation 724 that are displayed in the user interface 700 may be determined based at least in part on data items that have been received any time prior to receiving the request for the user interface 700.

V. Example Systems for Validating Hours of Operation

Figure 8:
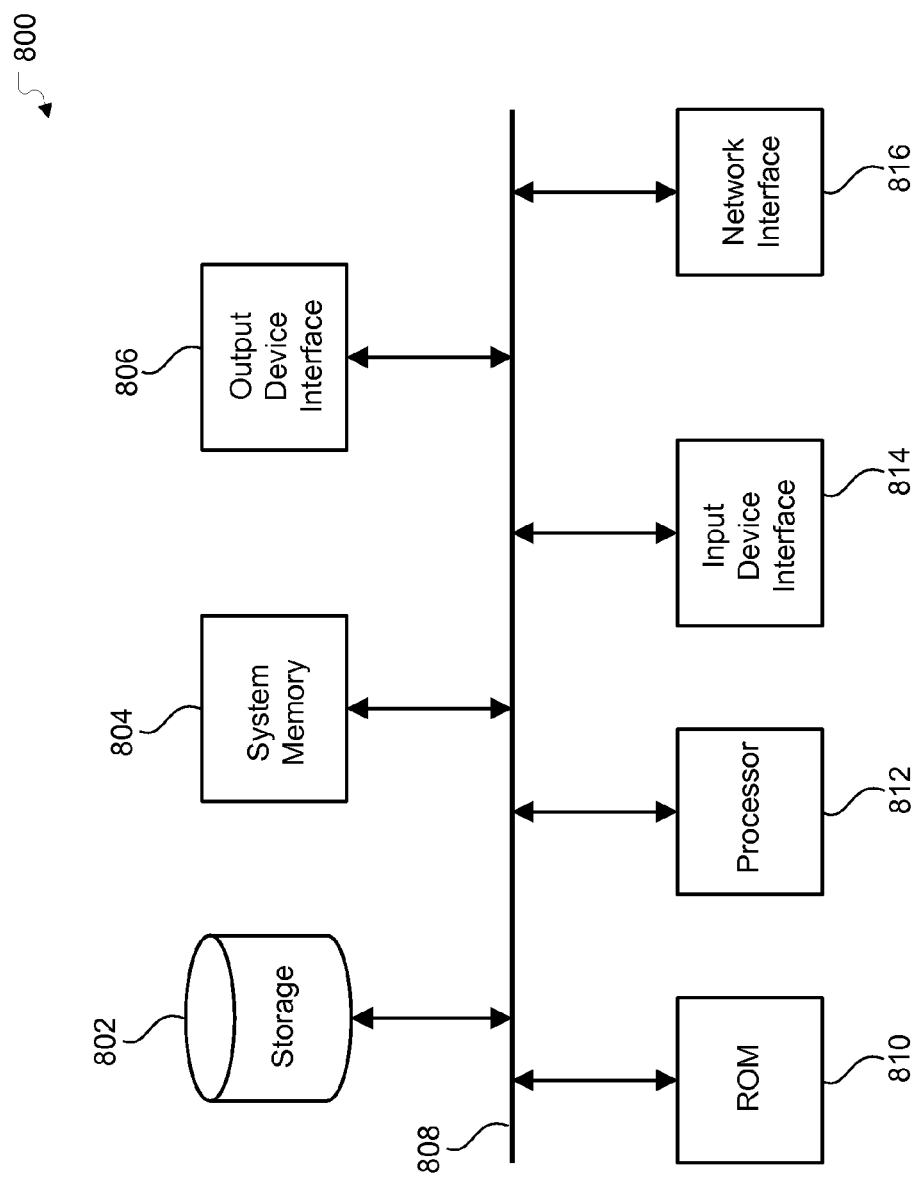
FIG. 8 conceptually illustrates an electronic system with which one or more implementations of the subject technology may be implemented.

FIG. 8 conceptually illustrates electronic system 800 with which any implementations of the subject technology may be implemented. Electronic system 800, for example, can be a desktop computer, a laptop computer, a tablet computer, a server, such as the server 110 of FIG. 1, a switch, a router, a base station, a receiver, a phone, a personal digital assistant (PDA), one or more of the electronic devices 102, 104, 106 of FIG. 1, or generally any electronic device that transmits signals over a network. Such an electronic system includes various types of computer readable media and interfaces for various other types of computer readable media. Electronic system 800 includes bus 808, processing unit(s) 812, system memory 804, read-only memory (ROM) 810, permanent storage device 802, input device interface 814, output device interface 806, and network interface 816, or subsets and variations thereof.

Bus 808 collectively represents all system, peripheral, and chipset buses that communicatively connect the numerous internal devices of electronic system 800. In one or more implementations, bus 808 communicatively connects processing unit(s) 812 with ROM 810, system memory 804, and permanent storage device 802. From these various memory units, processing unit(s) 812 retrieves instructions to execute and data to process in order to execute the processes of the subject disclosure. The processing unit(s) can be a single processor or a multi-core processor in different implementations.

ROM 810 stores static data and instructions that are needed by processing unit(s) 812 and other modules of the electronic system. Permanent storage device 802, on the other hand, is a read-and-write memory device. This device is a non-volatile memory unit that stores instructions and data even when electronic system 800 is off. One or more implementations of the subject disclosure use a mass-storage device (such as a magnetic or optical disk and its corresponding disk drive) as permanent storage device 802.

Other implementations use a removable storage device (such as a floppy disk, flash drive, and its corresponding disk drive) as permanent storage device 802. Like permanent storage device 802, system memory 804 is a read-and-write memory device. However, unlike storage device 802, system memory 804 is a volatile read-and-write memory, such as random access memory. System memory 804 stores any of the instructions and data that processing unit(s) 812 needs at runtime. In one or more implementations, the processes of the subject disclosure are stored in system memory 804, permanent storage device 802, and/or ROM 810. From these various memory units, processing unit(s) 812 retrieves instructions to execute and data to process in order to execute the processes of one or more implementations.

Bus 808 also connects to input and output device interfaces 814 and 806. Input device interface 814 enables a user to communicate information and select commands to the electronic system. Input devices used with input device interface 814 include, for example, alphanumeric keyboards and pointing devices (also called "cursor control devices"). Output device interface 806 enables, for example, the display of images generated by electronic system 800. Output devices used with output device interface 806 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, bus 808 also couples electronic system 800 to a network (not shown) through network interface 816. In this manner, the computer can be a part of a network of computers (such as a local area network ("LAN"), a wide area network ("WAN"), or an Intranet, or a network of networks, such as the Internet. Any or all components of electronic system 800 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer-implemented method for validating hours of operation of a business, the method comprising:
   receiving, by one or more computing devices, hours of operation of a business for a day of a week;
   receiving, by the one or more computing devices, a plurality of data items that are each associated with a time of the day of the week, wherein each of the plurality of data items is reflective of, or evidence of, an operational status of business at the associated time of the day of the week, wherein each of the plurality of data items is received from one or more servers and is indicative of a user request for interaction with the business or a user interaction with the business from positioning information received from a mobile device associated with a user;
   determining, by the one or more computing devices, based at least in part on the operational status of the business that is reflected, or evidenced, by each of the plurality of data items, a likelihood that the hours of operation of the business for the day of the week are inaccurate, wherein the plurality of data items are associated with a plurality of weights and the determining further comprises determining, by the one or more computing devices and based at least in part on the operational status of the business that is reflected, or evidenced, by each of the plurality of data items and the associated plurality of weights, the likelihood that the hours of operation of the business for the day of the week are inaccurate; and providing, by the one or more computing devices, to a first electronic device comprising a mobile device associated with the business, a user interface having a first indication that the hours of operation for the day of the week are likely inaccurate when the likelihood exceeds a threshold such that the first electronic device displays the first indication alongside the hours of operation of the business in the user interface to a user of the first electronic device.

2. The computer-implemented method of claim 1, wherein the providing the first indication that the hours of operation for the day of the week are inaccurate comprises:

generating, by the one or more computing devices, an estimated hours of operation for the day of the week based at least in part on the operational status of the business that is reflected, or evidenced, by each of the plurality of data items; and providing, by the one or more computing devices, the estimated hours of operation for the day of the week.

3. The computer-implemented method of claim 2, further comprising:

receiving, by the one or more computing devices and in response to providing the estimated hours of operation for the day of the week, a confirmation that the hours of operation of the business for the day of the week are inaccurate; and correcting, by the one or more computing devices, the hours of operation of the business for the day of the week based at least in part on the estimated hours of operation for the day of the week.

4. The computer-implemented method of claim 2, further comprising:

receiving, by the one or more computing devices and from a second electronic device associated with a user, a request for the hours of operation for the business;

providing, by the one or more computing devices and to the second electronic device, the hours of operation for the business for the day of the week; and providing, by the one or more computing devices and to the second electronic device the estimated hours of operation for the business for the day of the week when the likelihood satisfies a threshold.

5. The computer-implemented method of claim 4, wherein the request for the hours of operation for the business is received on the day of the week and further comprising:

determining, by the one or more computing devices, a time that the request was received;

providing, by the one or more computing devices and to the second electronic device, a second indication that the business is open when the hours of operation of the business and the estimated hours of operation of the business both indicate that the business is open at the time that the request was received;

providing, by the one or more computing devices and to the second electronic device, a third indication that the business is closed when the hours of operation of the business and the estimated hours of operation of the business both indicate that the business is closed at the time that the request was received;

providing, by the one or more computing devices and to the second electronic device, a fourth indication that the business may be open when the hours of operation indicate that the business is closed and the estimated hours of operation indicate that the business is open; and providing, by the one or more computing devices and to the second electronic device, a fifth indication that the business may be closed when the hours of operation indicate that the business is open and the estimated hours of operation indicate that the business is closed.

6. The computer-implemented method of claim 1, wherein the hours of operation of the business for the day of the week comprise an opening time and a closing time.

7. The computer-implemented method of claim 6, wherein the likelihood that the hours of operation of the business for the day of the week are inaccurate satisfies the threshold when a number of the data items indicate that the business is open later than the closing time, that the business is open earlier than the opening time, that the business is closed earlier than the closing time, or that the business is closed later than the opening time.

8. The computer-implemented method of claim 1, wherein the receiving the plurality of data items that are each associated with the time of the day of the week comprises:

receiving, by the one or more computing devices, a second indication that an employee of the business is at a location of the business.

9. The computer-implemented method of claim 8, wherein the receiving the plurality of data items that are each associated with the time of the day of the week comprises:

receiving, by the one or more computing devices, a third indication that a non-employee is at the location of the business.

10. The computer-implemented method of claim 1, further comprising:

receiving, by the one or more computing devices, a plurality of hours of operation of a plurality of other businesses for the day of the week, wherein each of the plurality of other businesses is associated with a business category;

determining, by the one or more computing devices and based at least in part on the plurality of hours of operation of the plurality of other businesses, a profile hours of operation for the business category;

determining, by the one or more computing devices, whether the hours of operation of the business for the day of the week coincide with the profile hours of operation; and providing, by the one or more computing devices and to the first electronic device associated with the business, a first suggestion to associate the business with the business category when the received hours of operation of the business coincide with the profile hours of operation of the business category and the business is not associated with the business category.

11. The computer-implemented method of claim 10, further comprising:

providing, by the one or more computing devices and to the first electronic device associated with the business, a second suggestion that the hours of operation of the business should be modified to conform to the profile hours of operation of the business category when the hours of operation of the business do not coincide with the profile hours of operation and the business is associated with the business category.

12. The computer-implemented method of claim 10, further comprising:

determining, by the one or more computing devices, at least one of the plurality of other businesses associated with the business category for which the hours of operation do not coincide with the profile hours of operation; and providing, by the one or more computing devices, a second suggestion that the at least one of the plurality of other businesses should conform to the profile hours of operation or be disassociated with the business category.

13. A non-transitory machine readable medium embodying instructions that, when executed by a machine, cause the machine to perform a method for providing suggested hours of operation for a business, the method comprising:

receiving hours of operation of a business for a day of a week;

receiving a plurality of data items that are each associated with a time of the day of the week, wherein each of the plurality of data items is received from one or more servers and is indicative of a user request for interaction with the business or a user interaction with the business from positioning information received from a mobile device associated with a user, wherein the hours of operation of the business for the day of the week comprise an opening time and a closing time and wherein each of the plurality of data items is indicative of the user request for interaction with the business, the time of the day of the week associated with each of the plurality of data items being generated before the opening time of the business or after the closing time of the business;

determining, based at least in part on the plurality of data items and a plurality of weights associated with the plurality of data items, a modified hours of operation of the business for the day of the week and an earlier opening time for the day of the week or a later closing time for the day of the week; and providing to a mobile device for display a user interface having an indication of the modified hours of operation of the business for the day of the week alongside the hours of operation of the business.

14. The non-transitory machine readable medium of claim 13, wherein at least one of the plurality of data items that is indicative of the user request for interaction comprises a telephone call to the business that was initiated by a user, or an indication that the user was at a location of the business.

15. The non-transitory machine readable medium of claim 13, wherein at least one of the plurality of data items that is indicative of the user interaction with the business comprises a credit card transaction conducted by the business or an offer processed by the business.

16. The non-transitory machine readable medium of claim 13, wherein each of the plurality of data items is indicative of the user interaction with the business, the time of the day of the week associated with each of the plurality of data items is within a subset of the hours of operation, and the determined modified hours of operation comprises the subset of the hours of operation.

* * * * *